US008089649B2

(12) United States Patent
Okamoto

(10) Patent No.: US 8,089,649 B2
(45) Date of Patent: Jan. 3, 2012

(54) MULTI FUNCTION PERIPHERAL

(75) Inventor: Yoshinari Okamoto, Aichi (JP)

(73) Assignee: Brother Kogyo Kabushiki Kaisha, Nagoya, Aichi (JP)

(*) Notice: Subject to any disclaimer, the term of this patent is extended or adjusted under 35 U.S.C. 154(b) by 1144 days.

(21) Appl. No.: 11/526,831

(22) Filed: Sep. 26, 2006

(65) Prior Publication Data

US 2007/0076241 A1 Apr. 5, 2007

(30) Foreign Application Priority Data

Sep. 30, 2005 (JP) ................. 2005-286160

(51) Int. Cl.
G06F 3/12 (2006.01)
G06F 3/00 (2006.01)
G06F 7/04 (2006.01)
G03G 15/00 (2006.01)

(52) U.S. Cl. ............ 358/1.15; 358/1.13; 358/1.14; 715/733; 715/741; 715/743; 715/744; 715/745; 399/80; 399/81; 726/2; 726/4; 726/7; 726/17; 726/20

(58) Field of Classification Search ............... 358/1.15; 726/2, 4, 7, 17, 21, 27; 715/733, 741, 743, 715/744, 745; 399/1, 8, 80, 81
See application file for complete search history.

(56) References Cited

U.S. PATENT DOCUMENTS

| 5,999,766 | A  | * | 12/1999 | Hisatomi et al. | ............... | 399/80 |
| 6,313,921 | B1 | * | 11/2001 | Kadowaki | ................ | 358/1.15 |
| 2002/0097262 | A1 | * | 7/2002 | Iwase et al. | .................. | 345/744 |
| 2003/0086111 | A1 | * | 5/2003 | Akiyoshi | ................ | 358/1.14 |
| 2004/0218208 | A1 | * | 11/2004 | Akiyoshi et al. | ............ | 358/1.15 |
| 2004/0258429 | A1 | * | 12/2004 | Moroi | ........................ | 399/80 |
| 2005/0094195 | A1 | * | 5/2005 | Sakamoto et al. | ........... | 358/1.15 |
| 2005/0185215 | A1 | * | 8/2005 | Nishizawa et al. | ......... | 358/1.15 |
| 2005/0185217 | A1 | * | 8/2005 | Nishizawa et al. | ......... | 358/1.15 |
| 2005/0265744 | A1 | * | 12/2005 | Uruta | ............................. | 399/80 |
| 2006/0064741 | A1 | * | 3/2006 | Terao | .............................. | 726/4 |

FOREIGN PATENT DOCUMENTS

| JP | 2000-015898 | A | 1/2000 |
| JP | 2002-152446 |   | 5/2002 |
| JP | 2002-229916 | A | 8/2002 |
| JP | 2004-070708 | A | 3/2004 |
| JP | 2004-289302 | A | 10/2004 |

OTHER PUBLICATIONS

JP Office Action dtd Jun. 8, 2010, JP Appln. 2005-286160, English translation. Decision of Rejection dtd May 31, 2011, JP Appln. 2005-286160, English translation.
Decision for Dismissal of an Amendment dtd May 31, 2011, JP Appln. 2005-286160, English translation.
JP Office Action dtd Nov. 24, 2010, JP Application No. 2005-286160, English translation.

* cited by examiner

*Primary Examiner* — King Poon
*Assistant Examiner* — Vincent Peren
(74) *Attorney, Agent, or Firm* — Banner & Witcoff, Ltd.

(57) ABSTRACT

There is provided a multi function peripheral which has a plurality of functions which includes a communication unit that communicates with an external storage device which has a connection with the multi function peripheral, and a registration information acquisition unit that acquires registration information stored in the storage device indicating whether each of the plurality of functions is allowed to be used, through the communication unit. The multi function peripheral operates so that functions for which usage is indicated to be allowed by the registration information are caused to be executed according to operations of the multi function peripheral by a user, and functions of which usage is indicated not to be allowed by the registration information are prevented from being executed irrespective of operations of the multi function peripheral by the user.

18 Claims, 8 Drawing Sheets

| | 71 | | |
|---|---|---|---|
| 71a | FILE NAME | [ABC] | |
| 71b | PRODUCT IDENTIFICATION NUMBER | [MODE CODE] [DEVICE CODE] | |
| 71c | FILE PASSWORD | [ * * * * * * ] | |
| 71d | PANEL SETTING PERMISSION SETUP | GENERAL SETUP | [ON] [OFF] |
| | | FAX TRANSFER SETUP | [ON] [OFF] |
| | | TELEPHONE DIRECTORY SETUP | [ON] [OFF] |
| 71e | INDIVIDUAL USER SETUP | PUBLIC USER | |
| | | USER 1 | |
| | | USER 2 | |
| | | ⋮ | |
| 71f | GENERAL SETUP | RECEIVING MODE | |
| | | DATA & TIME | |
| | | IDENTIFICATION NUMBER | |
| | | TONE/PULSE | |
| | | LANGUAGE(JAPANESE, ENGLISH, ETC.) | |
| 71g | FAX TRANSFER SETUP | FAX FORWARDING SETUP | |
| | | REMOTE CODE SETUP | |
| | | BACKUP PRINT SETUP | |
| 71h | TELEPHONE DIRECTORY SETUP | ONE-TOUCH DIAL SETUP | |
| | | SPEED DIAL SETUP | |
| | | ONE-TOUCH/SPEED ON-OFF | |

FIG. 4

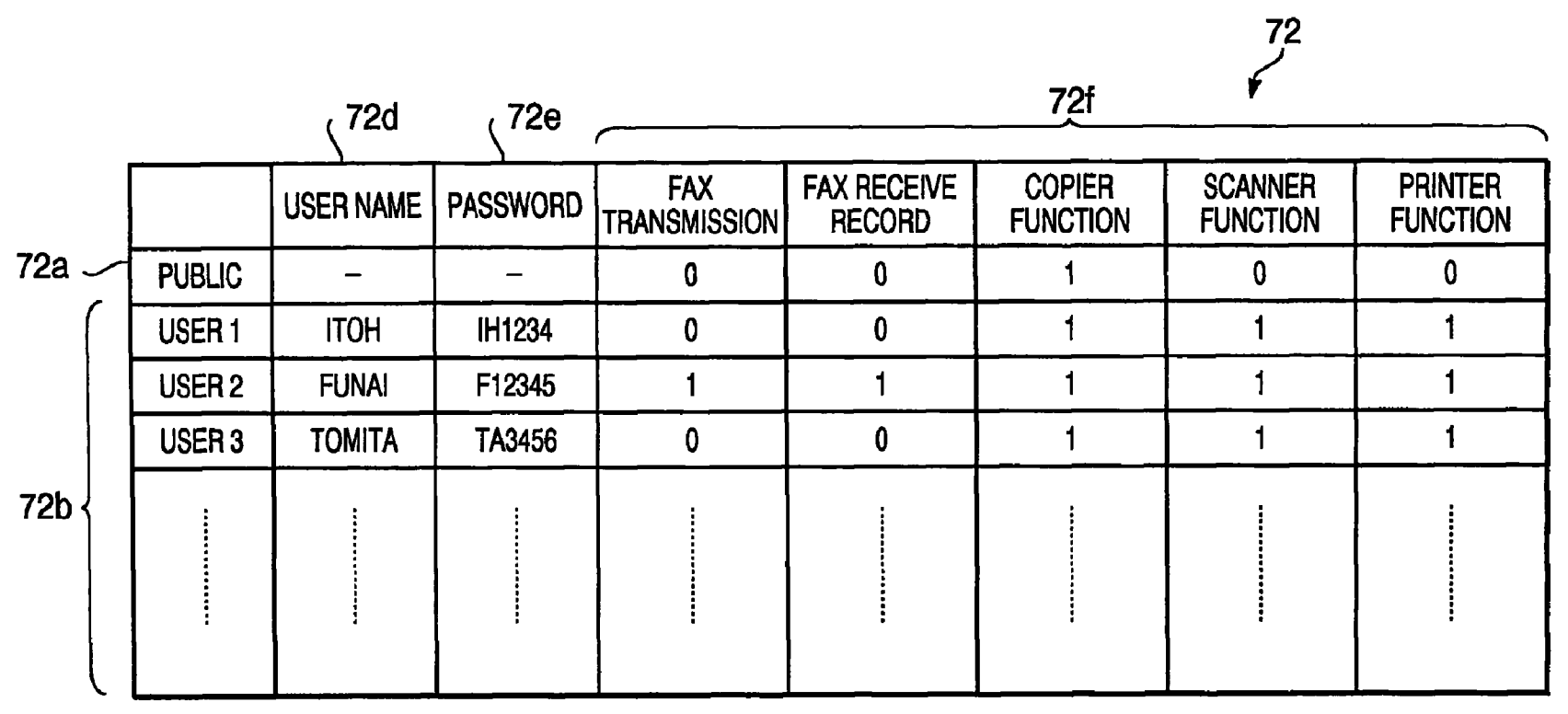

|  | USER NAME | PASSWORD | FAX TRANSMISSION | FAX RECEIVE RECORD | COPIER FUNCTION | SCANNER FUNCTION | PRINTER FUNCTION |
|---|---|---|---|---|---|---|---|
| PUBLIC | — | — | 0 | 0 | 1 | 0 | 0 |
| USER 1 | ITOH | IH1234 | 0 | 0 | 1 | 1 | 1 |
| USER 2 | FUNAI | F12345 | 1 | 1 | 1 | 1 | 1 |
| USER 3 | TOMITA | TA3456 | 0 | 0 | 1 | 1 | 1 |
| ...... | ...... | ...... | ...... | ...... | ...... | ...... | ...... |

FIG. 5

MULTI FUNCTION PERIPHERAL

This application claims priority under 35 U.S.C. 119 from Japanese Patent Application No. 2005-286160, filed on Sep. 30, 2005. The entire subject matter of the application is incorporated herein by reference.

BACKGROUND

1. Technical Field

The present invention relates to a multi function peripheral having a plurality of functions such as a facsimile, a copier, a scanner, a multi function peripheral system, and a functional control method in the multi function peripheral system.

2. Related Art

A multi function peripheral is widely known which is provided with a plurality of functions, a facsimile transmission function to transmit image information via a communication line and a facsimile receive function to receive image information, a copier function to read image information recorded on a record medium and record the image information on another record medium, a scanner function to read image information recorded on a record medium and stored in a memory unit, etc.

Japanese Patent Application Provisional Publication No. P2002-152446A discloses a multi function peripheral which stores menu display data for each user in the memory unit beforehand, displays the menu corresponding to a user when the user inputs his/her identification information (password), and allows the user to use functions indicated by the menu.

However, in order to set up whether each of plurality of functions of the multi function peripheral is allowed to be used, it is necessary to go to the place where the multi function peripheral is installed, and execute a setup operation with the operation panel of the multi function peripheral. Further, there was a problematical point that the setup operation is troublesome.

SUMMARY

Aspects of the invention are advantageous in that there are provided a multi function peripheral which can be easily set up whether each of the plurality of functions from an external device is allowed to be used, a multi function peripheral system, and a functional control method in the multi function peripheral system.

BRIEF DESCRIPTION OF THE ACCOMPANYING DRAWINGS

FIG. 4 is a table which shows the information which is written in the MFP setup file.

FIG. 5 shows tables of individual registration information and public registration information.

DESCRIPTION

General Overview

Figure 1:
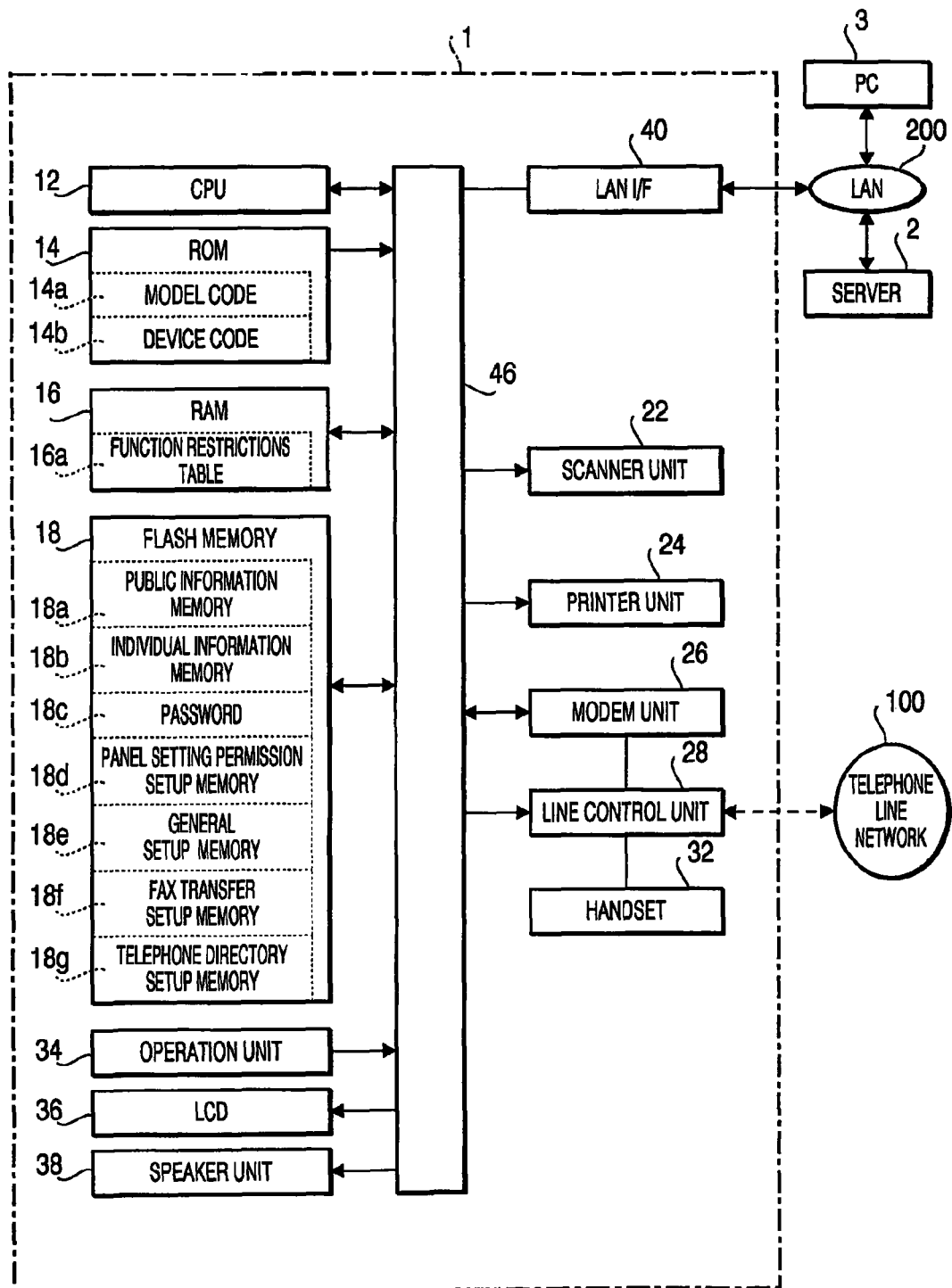
FIG. 1 is a block diagram which shows an electrical configuration of a communication system containing a multi function peripheral according to the embodiment of the present invention.

According to aspects of the invention, there is provided a multi function peripheral which has a plurality of functions which includes a communication unit that communicates with an external storage device which has a connection with the multi function peripheral, and a registration information acquisition unit that acquires registration information stored in the storage device indicating whether each of the plurality of functions is allowed to be used, through the communication unit. The multi function peripheral operates so that functions of which usage is indicated to be allowed by the registration information are made to be executed according to operations of the multi function peripheral by a user, and functions of which usage is indicated not to be allowed by the registration information are prevented from being executed irrespective of operations of the multi function peripheral by the user.

Therefore, it is not necessary to set up whether each of the plurality of functions of the multi function peripheral is allowed to be used, and it is possible to set up easily. Further by setting up in this way, when the operation is done by the multi function peripheral, it is possible to determine whether the function is allowed to be executed.

Optionally, the registration information acquisition unit may acquire registration information corresponding to the device identification information of the multi function peripheral among multiple registration information corresponding to each device identification information of a plurality of multi function peripherals stored in the storage device.

Therefore, it is possible to do individual setup easily for each multi function peripheral.

Optionally, the multi function peripheral may include an input unit to input individual identification information which is to identify the user, and the registration information acquisition unit may acquire registration information stored in the storage device corresponding to the individual identification information which is to identify the user based on the individual identification information input to the input unit.

Therefore, it is not necessary to set up registration information corresponding to individual identification information which identifies a user, and it is possible to do setup for each user easily.

Optionally, the multi function peripheral may include an input unit to input individual identification information which is to identify the user, and the registration information acquisition unit that acquires registration information which identifies the user stored in the storage device corresponding to the individual identification information based on the individual identification information in case that individual identification information may be input into the input unit, and may acquire registration information stored in the storage device which is not corresponding to any of the individual identification information to identify a user.

Therefore, it is not necessary to setup registration information corresponding to individual identification information which identifies a user and a public user who does not have his/her identification information, and it is possible to do setup for an individual user and a public user easily.

Optionally, the multi function peripheral may include a registration information memory unit that stores registration information, and the registration information acquisition unit stores the registration information acquired from the storage device. The multi function peripheral operates so that functions of which usage is indicated to be allowed by the registration information are made to be executed according to operations of the multi function peripheral by a user, and functions of which usage is indicated not to be allowed by the registration information are prevented from being executed irrespective of operations of the multi function peripheral by the user.

Therefore, it is possible to control as early as when the operation by the user is done, and even while communication with the storage device is not done, it is possible to determine whether the function is allowed to be executed.

Optionally, the registration information acquisition unit may acquire registration information indicating an operation setup of the plurality of functions from the storage device.

Therefore, it is not necessary to set up the multi function peripheral, and it is possible to do operation setup of the plurality of functions easily.

Optionally, the registration information acquisition unit may acquire registration information indicating an operation setup of the plurality of functions from the storage device.

Therefore, it is not necessary to set up the multi function peripheral, and it is possible to do easily setup whether setups of a plurality of functions are allowed with the operation unit.

According to aspects of the invention, there is provided a multi function peripheral system which includes a multi function peripheral that has a plurality of functions, a storage device. The multi function peripheral has a communication unit which communicates with the storage device, and the storage device that has information communication with the multi function peripheral. The storage device includes a memory unit that stores registration information indicating whether each of the plurality of functions is allowed to be used, and a registration information setup unit that stores the registration information in the memory unit. The multi function peripheral includes a registration information acquisition unit that acquires registration information stored in the memory unit of the storage device via the communication unit. The multi function peripheral operates so that functions of which usage is indicated to be allowed by the registration information are made to be executed according to operations of the multi function peripheral by a user, and functions of which usage is indicated not to be allowed by the registration information are prevented from being executed irrespective of operations of the multi function peripheral by the user.

Therefore, it is not necessary to do setup whether each of the plurality of functions of the multi function peripheral are allowed to be used, and it is possible to set up easily. Further by setting up in this way, when the operation is done by the multi function peripheral, it is possible to determine whether the function is allowed to be executed.

Optionally, the multi function peripheral system may include a plurality of the multi function peripherals.

According to aspects of the invention, there is provided a functional control for a multi function peripheral system which includes a multi function peripheral that has a plurality of functions, a storage device. The multi function peripheral has a communication unit which communicates with the storage device, and the storage device that has information communication with the multi function peripheral. The storage device includes a memory unit that stores registration information indicating whether each of the plurality of functions is allowed to be used, and a registration information setup unit that stores the registration information in the memory unit. The multi function peripheral includes a registration information acquisition unit that acquires registration information stored in the memory unit of the storage device via the communication unit. The multi function peripheral operates so that functions of which usage is indicated to be allowed by the registration information are made to be executed according to operations of the multi function peripheral by a user, and functions of which usage is indicated not to be allowed by the registration information are prevented from being executed irrespective of operations of the multi function peripheral by the user.

Therefore, it is not necessary to set up whether each of the plurality of functions of the multi function peripheral is allowed to be used, and it is possible to set up easily. Further by setting up in this way, when the operation is done by the multi function peripheral, it is possible to determine whether the function is allowed to be executed.

According to aspects of the invention, there is provided a computer program product for a multi function peripheral which has a plurality of functions, comprising computer readable instructions to be executed by a computer, the instructions causing the computer to function as a communication unit that communicates with an external storage device which has a connection with the multi function peripheral, and a registration information acquisition unit that acquires registration information stored in the storage device indicating whether each of the plurality of functions is allowed to be used, through the communication unit. The multi function peripheral operates so that functions of which usage is indicated to be allowed by the registration information are made to be executed according to operations of the multi function peripheral by a user, and functions of which usage is indicated not to be allowed by the registration information are prevented from being executed irrespective of operations of the multi function peripheral by the user.

Embodiments

Hereinafter, embodiments according to the invention will be described with reference to the accompanying drawings. FIG. 1 is a block diagram which shows a configuration of a communication system that contains a multi function peripheral (hereinafter referred to an MFP) of an embodiment according to aspects of the present invention. As can be seen in FIG. 1, the communication system is configured with the MFP 1 which has a plurality of functions such as a facsimile function, a server 2 and a personal computer 3 (hereinafter referred to a PC 3) which are communicatably connected to the MFP 1. As shown in FIG. 1, the MFP 1 of the communication system is also connected to a telephone line network 100.

The MFP 1 has a facsimile function which realizes facsimile communication and a voice call function which realizes voice communication via the telephone line network 100. The MFP 1 also contains various functions such as a printer function, a copier function, a scanner function, e-mail transmission function in its body. Further, the MFP 1 contains a PC fax function which forwards received fax data to the personal computer 3 via a LAN.

As shown in FIG. 1, the MFP 1 includes a CPU 12 which controls operations of the entire MFP 1, a ROM 14 which stores various control programs which are executed by the CPU 12, and fixed value data, a RAM 16 which is a memory for storing temporarily necessary data and programs in various processes executed by the CPU 12, a rewritable nonvolatile flash memory 18 which stores various setups, a scanner unit 22, a printer unit 24, a modem 26, a line control unit 28, a handset 32 which is detachable from a body part of the MFP 1 and is used for telephone transmission and receiving in the voice call function, an operation unit 34 which has a plurality of operation input keys (buttons and switches) to execute various functions of the MFP 1, an LCD 36 which is a liquid crystal display (hereinafter referred to an "LCD") to display various information of the MFP 1, a speaker unit 38 which has a speaker and a drive circuitry to drive the speaker, a LAN I/F 40 which is a LAN interface unit (hereinafter referred to a "LAN I/F") to connect with the server 2 and the PC 3 to the LAN 200 (Local Area Network 200).

The CPU 12, the ROM 14, the RAM 16, the flash memory 18, the scanner unit 22, the printer unit 24, the modem 26, the line control unit 28, the operation unit 34, the LCD 36, the speaker unit 38, and the LAN I/F 40 are connected to each other via a bus line 46. Furthermore, the line control unit 28 is connected to the modem 26 or the handset 32 via a transmission path.

The scanner unit 22 reads out an image from an original copy set at a prescribed reading position (not shown), and generates image data of the image based on an instruction from the CPU 12. The image data read out by the scanner unit 22 is transmitted to a communication partner device designated by a telephone number, etc., through the modem 26, the line control unit 28 and the telephone line network 100, when the MFP 1 is set in a facsimile mode (hereinafter referred to a "FAX mode") where a facsimile function is activated in the MFP 1. Alternatively, the image data is transmitted through LAN I/F 40, via the Internet facsimile which utilizes a mail function.

In addition, when the MFP 1 is set in a copy mode (hereinafter referred to a "COPY mode") where a copier function is activated in the MFP 1, image data generated by the scanner unit 22 is printed out on a record paper by the printer unit 24. Further, when the MFP 1 is set in a scanner mode (hereinafter referred to a "SCAN mode") where a scanner function activated in the MFP 1, the image data generated by the scanner unit 22 is stored in a prescribed memory region of the RAM 16.

The printer unit 24 is configured with an ink jet printer which prints on record papers set at a prescribed paper feed position (not shown) based on instructions from the CPU 12, and has a record paper feed motor which feeds record papers (not shown), a print head which propels droplets of ink onto record papers (not shown), and a carriage motor which moves a carriage to which the print head is mounted (not shown).

When the MFP 1 is setup in the FAX mode to print facsimile data received through the telephone line network 100, the line control unit 28 and the modem 26 from the communication partner device, image data generated by the printer unit 24 is printed on a record paper based on the received facsimile data.

In addition, when the MFP 1 is set up in the COPY mode, the image data generated by the scanner unit 22 is printed on a record paper by the printer unit 24.

The modem 26 modulates the image data generated by the scanner unit 22, generates image signal transmittable to the telephone line network 100 via the line control unit 28, demodulates the image signals input from the telephone line network 100 via the line control unit 28 into image data based on instruction from the CPU 12.

The line control unit 28 handles various signal inputs from the telephone line network 100 and signal outputs to the telephone line network 100 and set up a transmission path between the line control unit 28 and the telephone line network 100 based on instructions from the CPU 12. When the operation to transmit the image (transmit facsimile data) by the operation unit 34 is executed, or when image signal is received (facsimile data is received) from the telephone line network 100, a path toward the modem 26 is set up as the transmission path. Then, the image signal can be transmitted through the path. Whereas, the set up transmission path is cancelled when the image signal output by the modem 26 is completed, or the image signal input is completed from the telephone line 100, and the image signal is not transmitted through the path.

When an operation to detach the handset 32 from a body part of the MFP 1 is executed (offhook operation), a path from the line control unit 28 to the handset 32 is set up as the above described transmission path, and audio signal can be transmitted through the path. The transmission path which is set up in this way is cancelled when an operation to put the handset 32 back to the body part of the MFP 1, then, audio signal cannot be transmitted through the path.

The ROM 14 stores a product identification number of the MFP 1 as a fixed value. This product identification number is identification information which specifies the MFP 1, and includes a model code which shows a type of product and a device code which identifies each of products. The product identification number is also written in the MFP setup file 71 (see FIG. 4) which is set in the server 2. When the MFP 1 acquires the file, the product identification number is referred, and it is verified whether it is the number which is set in association with the product.

A RAM 16 has a function restrictions table 16a. When the user selected one of the functions, FAX mode, COPY mode, SCAN mode, etc., the function restrictions table 16a1 is referred and it is determined whether the function is allowed to be used by the user.

The flash memory 18 includes a public information memory 18a, an individual information memory 18b, a password memory 18c, a panel setting permission setup memory 18d, a general setup memory 18e, a FAX transfer setup memory 18f and telephone directory setup memory 18g.

The public information memory 18a stores public registration information which sets up whether it is allowed or not for a public user who is not individually registered to use each function of the plurality of functions of the MFP 1. When the MFP 1 is supplied from the maker (at the time of shipment from the factory), all functions are set up not to be allowed to use. As a specific person, the administrator sets up a password, and when the password is input, public registration information can be rewritten.

The individual information memory 18b stores individual registration information that sets up whether it is allowed or not for individual user to use each function. Similarly to the public registration information, as a specific person, the administrator sets up a password, and when the password is input and his/her identification is authenticated, individual registration information of each user can be rewritten. In case that individual registration information is rewritten, public registration information is read out from the public information memory 18a, and the public registration information can be registered as individual registration information as it is in the individual information memory 18b.

The password memory 18c stores the above-mentioned administrator's password and the file password which is written in the MFP setup file 71. The file password is collated when the MFP setup file 71 is acquired from the server 2, and it is verified whether it is the number which is set in association with the product.

The panel setting permission setup information 71d stored in the panel setting permission setup memory 18d, the general setup information 71f stored in the general setup memory 18d, the FAX transfer setup information 71g stored in the FAX transfer setup memory 18e and the telephone directory setup information 71h stored in the telephone directory setup memory 18g are described later, it mentions later referring to FIG. 4.

Figure 2:
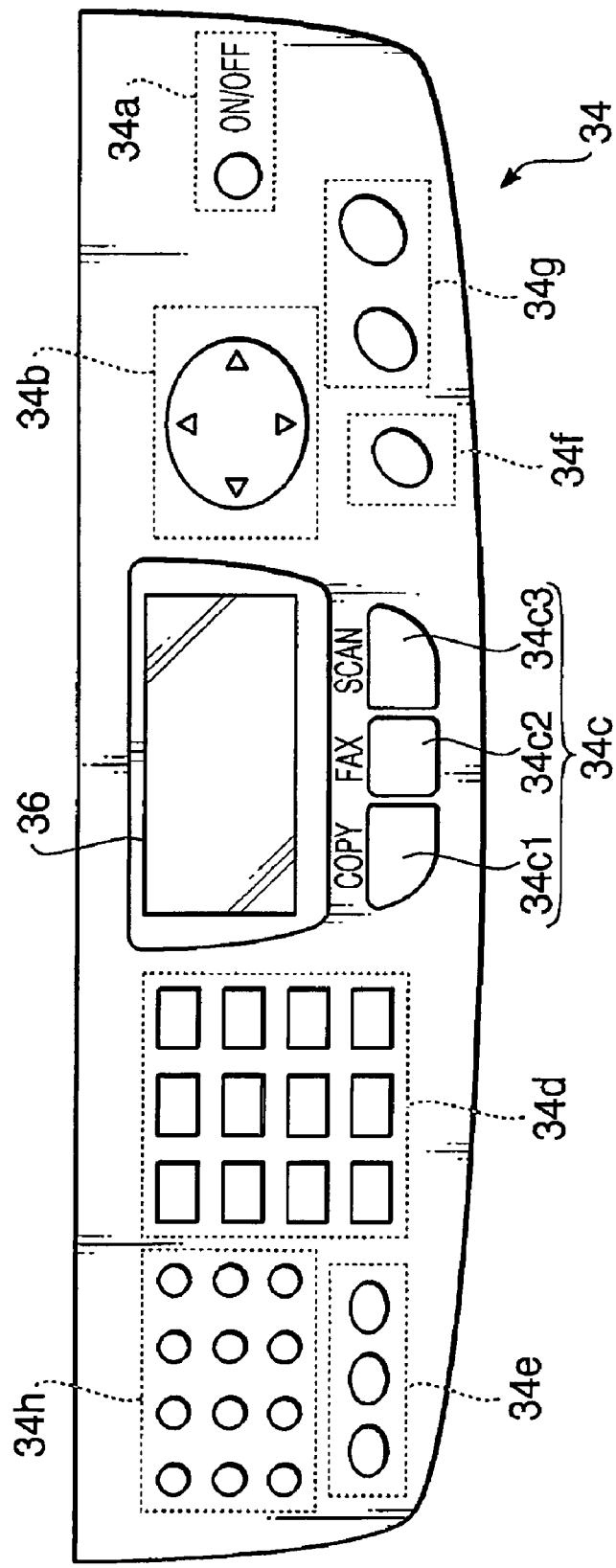
FIG. 2 is a plain view of the operation panel portion of the multi function peripheral.

Next, referring to FIG. 2, the operation panel portion in the MFP 1 is explained. FIG. 2 is a plain view of the operation panel portion of the MFP 1. As shown in FIG. 2, the operation panel portion is configured with various operation input keys 34a-34h and an LCD 36 which form operation unit 34.

When the power source key 34a is depressed while the MFP 1 is in the power source shut off state, the power source is turned on in the MFP 1. When the power source key 34a is depressed while the MFP 1 is in the power source turn on state, the power source is shut off in the MFP 1.

The operation input keys 34b are a cross cursor key and set keys to select options displayed on the LCD 36 which shows functions to be executed in the MFP 1 or setting values. By depressing peripheral points in up, down, left and right of the operation input key 34b, a cursor displayed on the LCD 36 can be moved in the upward, downward, left, and right directions and the functions can be selected and displayed. Then, when the cursor is positioned at the point indicating an option corresponding to the desired function or setting value, by depressing a central part of the operation input key 34b (hereinafter, referred to "setting operation"), the function or the setting value to which the cursor position is corresponding is selected or set up.

The operation input key 34c is a mode selection key (hereinafter, referred to "mode selection key 34c"), is provided with a COPY mode key 34c1 which makes a copier function of the MFP 1 work, a FAX mode key 34c2 which makes a facsimile function of the MFP 1 work, and a SCAN mode key 34c3 which makes a scanner function of the MFP 1 work.

In case that the MFP 1 is set up in the lock off condition, when any one of the mode selection keys 34c (34c1-34c3) is depressed, the MFP 1 executes the corresponding function to the depressed mode selection key 34c (34c1-34c3). Whereas, in case that the MFPI is set up in the lock on condition, when any one of the mode selection keys 34c (34c1-34c3) is depressed, the function restrictions table 16a1 is referred, and when the function restrictions table 16a1 indicates usage of the function is allowed, the function is executed. When the function restrictions table 16a1 indicates usage of the function is not allowed, the speaker unit 38 is made to sound to notify the user that usage of the function is not allowed, and the LCD 36 displays a message thereof.

The operation input keys 34d constitute a numeric keypad, in case that the MFP 1 is in facsimile mode, the operation input keys are used to input a telephone number of a communication partner device to which facsimile data is transmitted and to input setting values and a password by the administrator or the registered user due.

The operation input keys 34e are menu buttons, and to instruct menu display, or execution of a specific function (for example, an on-hook dial function in a FAX mode) in various modes The operation input key 34f is a stop button, and is used to instruct to stop execution of a function during execution of various functions. The operation input key 34f is a stop button, and is used to instruct to stop execution of a function during execution of various functions. The operation input key 34g is a start button, and is used to instruct to start execution of functions in FAX mode, COPY mode, etc.

One-touch dial key 34h is configured with 12 buttons. A telephone number or a facsimile number of a communication partner can be assigned arbitrarily to each button.

The LCD 36 is a liquid crystal display which shows various information of the MFP 1. For example, the LCD 36 displays waiting information of current setup situation, etc., in operation waiting time of the MFP 1, besides the above described function at function setup time or setup display for setting values.

Figure 3:
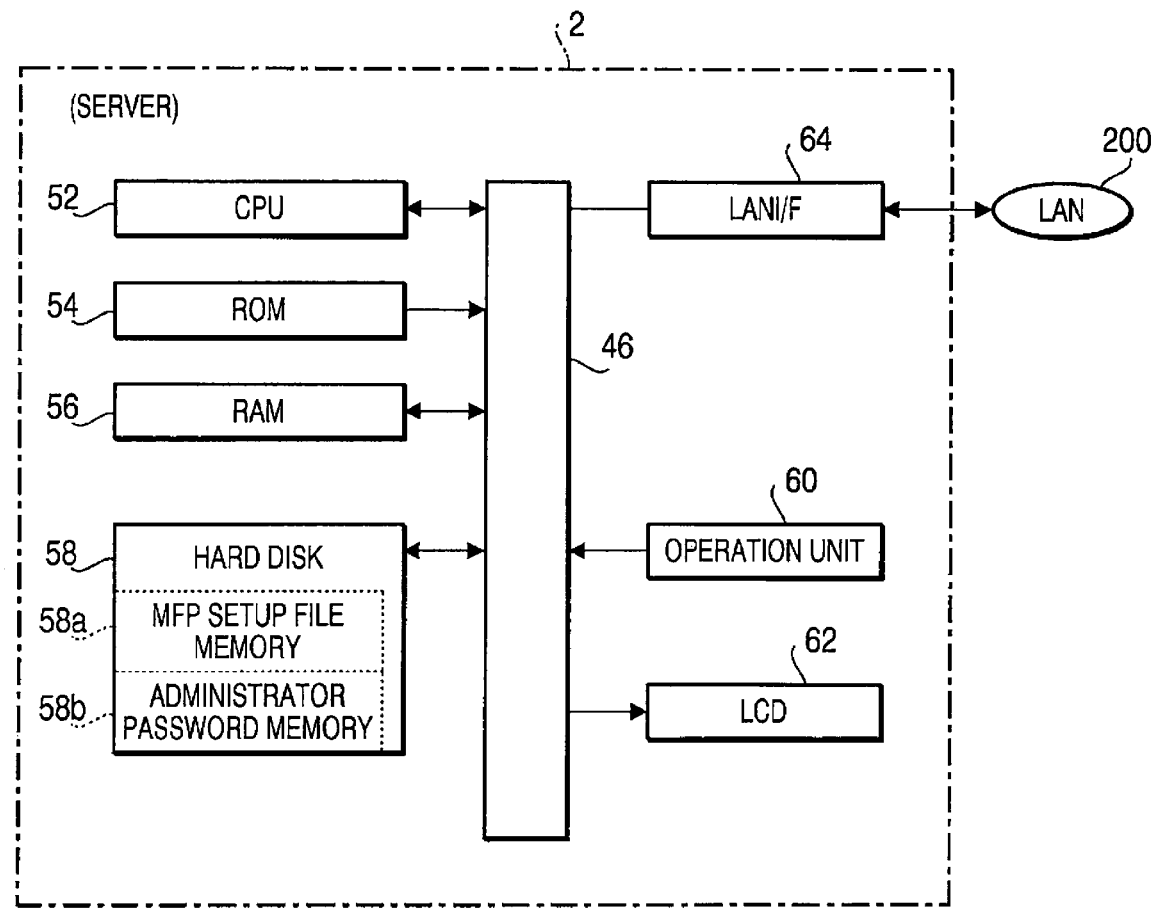
FIG. 3 shows tables of individual registration information and public registration information.

Next, referring to FIG. 3, the server 2 is explained. FIG. 3 is the block diagram which shows an electric configuration of server 2. As shown in FIG. 3, the server 2 includes a CPU 52, a ROM 54 which stores various control programs which are executed by the CPU 52 and fixed value data, a RAM 56 which is a memory for storing temporarily necessary data and programs in various processes executed by the CPU 52, a rewritable nonvolatile hard disk 58 which stores various setups, an operation unit 60 which is configured with a keyboard having a plurality of operation input keys to set up various functions and a mouse, an LCD 62 which is a liquid crystal display (hereinafter referred to an "LCD") to display various information of the server 2, and a LAN I/F 64 which is a LAN interface unit (hereinafter referred to a "LAN I/F") to connect with the MFP 1 and the PC 3 to the LAN 200 (Local Area Network 200).

The CPU 52, the ROM 54, the RAM 56, the hard disk 58, the operation unit 60, the LCD 62, and the LAN I/F 64 are connected to each other via a bus line.

The hard disk 58 has a MFP setup file memory 58a and an administrator password memory 58b. The MFP setup file memory 58a stores the MFP setup file 71 in association with each of the plurality of the MFPs which are connected via the LAN 200. The MFP setup file 71 is read out from each the MFP 1 periodically, and setup items which are written in the MFP setup file 71 are stored in the flash memory 18 of the MFP 1. Referring to FIG. 4, information written in the MFP setup file 71 is explained later. The administrator password memory 58b is a password which is known by only the administrator who is permitted to set up the MFP setup file 71 of the server 2. When the administrator password is input correctly, the MFP setup file 71 can be set up or modified.

Next, referring to FIG. 4, the MFP setup file 71 is explained. FIG. 4 is a table which shows items which are set up in the MFP setup file 71. The MFP setup file 71 is generated by displaying each item on the LCD 62 of the server 2 and using the keyboard, etc. A process of generation of the MFP setup file 71 is described later referring to FIG. 6 later.

Firstly, a file name 71a which specifies a file is attached to the MFP setup file 71. The file name 71a is also stored in a corresponding MFP 1. The MFP 1 designates a MFP setup file based on the file name. By searching in the server 2, an address where the file is stored in the MFP 1 is notified, and the MFP 1 acquires a corresponding file which based on the address.

Next, a product identification number 71b is written. The product identification number 71b is identification information which identifies each one of the plurality of the MFPs which are connected to the server 2. The product identification number 71b is configured with a model code which shows a type of the product and a device code which identifies each of products. The model code and the device code are identical with those which are stored in the ROM 14 of the corresponding MFP 1. When the MFP setup file 71 is read out by the MFP 1, the product identification number 71b is collated and verified by the MFP 1.

Next, file password 71c is written. The file password 71c is also stored in the MFP 1. When the MFP setup file 71 is read out by the MFP 1, the file password 71c is collated and verified by the MFP 1. By verifying both of the product identification number 71b and the file password 71, a setup in the MFP 1 is executed. Therefore, it is possible to prevent an error in setting up.

Next, panel setting permission setup information 71d of is written. The panel setting permission setup information 71d is concerning items which can be set up using the panel of the MFP 1. The items are concerning whether setups on the panel Enable(On) or Disable(Off) for the general setup, the FAX transfer setup and the telephone directory setup respectively. The general setup, the FAX transfer setup and the telephone directory setup are described later.

Next, individual user setup information 71e is written. The individual user setup information 71e indicates whether usage of each of the plurality of the functions of the MFP 1, such as facsimile transmission function and facsimile reception function, is allowed to be used by a public user whose password is not registered or a user whose password is registered respectively. The individual user setup 71e is described later referring to FIG. 5.

Next, generality setup information 71f is written. The general setup information 71f indicates such as a setup of reception mode, a setup of day and time, a setup of identification information and a setup of display characters. In reception modes, a mode where only facsimile is received and a mode where both of facsimile and telephone are received, a mode where telephone by the external telephone is received, and a manual mode, etc. are included. Any of the reception modes can be set up.

In the setup of day and time, the present time can be set up to the unit of year, month, day, hour, minute and second. In the setup of the identification information, a facsimile number of the MFP 1, a telephone number and a name of the receiver (a full name), etc. can be set up. In addition, it is possible to set up whether the telephone line is tone or pulse. Further, in setting of display characters, characters displayed on the LCD 36 which is a display device and a language (Japanese, English, etc.) used in reports such as facsimile receiving record can be set up.

Next, FAX transfer setup information 71g is written. As for the FAX transfer setup information 71g, each of items of "transfer off", "forward", "paging", "FAX storage" and "PC FAX reception" is set up. "transfer off" indicates case that normative reception is executed where received facsimile is not transferred. "forward" indicates a function to transfer received information to the device which has the facsimile number assigned. "paging" indicates a function which informs a pocket pager about the fact that facsimile is received. "FAX storage"indicates a function which sets up whether received FAX data is stored in a memory. "PC FAX reception" indicates a function which transfers received FAX data to a designated PC.

Next, telephone directory setup information is written. As for the telephone directory setup information 71h, a setup of a one-touch dial, a setup of a speed dial, and a setup whether usage of the one-touch dial and the speed dial is allowed. "one-touch dial" indicates a function which associates each of the one-touch dial keys 34h which is supplied in the operation panel 34 with a telephone number or an e-mail address, and stores a name (a full name) which corresponds to the telephone number or e-mail address and a classification flag which shows the setup is the telephone number or e-mail address.

"speed dial" indicates a function which specify a communication partner with a cursor. When the speed dial is selected to be used, a list of communication partners is stored in the flash memory 18 of the MFP 1 is displayed on the LCD 36. The communication partner is specified by positioning the cursor with the operation input key 34b at the desired partner on the screen. The setup whether usage of the one-touch dial and the speed dial is allowed is a setup whether usage of the one-touch dial key 34h and the speed dial of the operation unit 34. When the setup is "on", the one-touch dial and the speed dial are allowed to be used. When the setup is "off", the use of the one-touch dial or the speed dial is not allowed to be used.

Next, referring to FIG. 5, the individual user setup written in MFP setup file 71 is explained. FIG. 5 is the individual user setup table 72 which shows the individual user setup which is written in MFP setup file 71. A first line of the individual user setup table 72 indicates setup items corresponding to users. A second line 72a corresponds to a public user and a third second line-the last line 72b correspond to each of registered users. A first column of the function setting table 72 indicates one of users. A second column 72d indicates user names. A third column 72e indicates passwords. Fourth-eighth columns 72f indicate each function The each function means a facsimile transmission function shown in the fourth column, a facsimile receiving record function shown in the fifth column, a copier function shown in the sixth, a scanner function shown in the seventh column, or a printer function shown in the eighth column. The facsimile transmission function is the item to indicate whether the facsimile transmission function of the MFP 1 is allowed to be used. All received facsimile data is stored in the RAM of the MFP 1 instead of printing on a record medium. The facsimile receiving record function is a function which enables users who are allowed usage to display received contents on the LCD 36 to confirm, in case that the user determines it can be output, and to print it on the record medium or transmit it to the PC of a receiver via the LAN 200.

COPIER FUNCTION and SCANNER FUNCTION are the items to indicate whether the copier function or the scanner function of MFP 1 is allowed to be used. The printer function is a function to receive image information from PCs via the LAN 200 and to print it. PRINTER FUNCTION is the item to indicate whether the printer function is allowed to be used by recognizing the user identified from the address of the transmitted PC at the time receiving image information. There is no user name or a password as to a public user.

In the function setting table 72, as to each user, in case that usage of each function is allowed (Enable), "1" is stored, and in case that usage is not allowed (Disable), "0" is stored. For example, in the function setting table 51 shown in FIG. 3, only usage of a copier function is allowed for a public user, all other functions are set up not to be allowed to be used, and usage of all functions are set up to be allowed for user 2.

Figure 6:
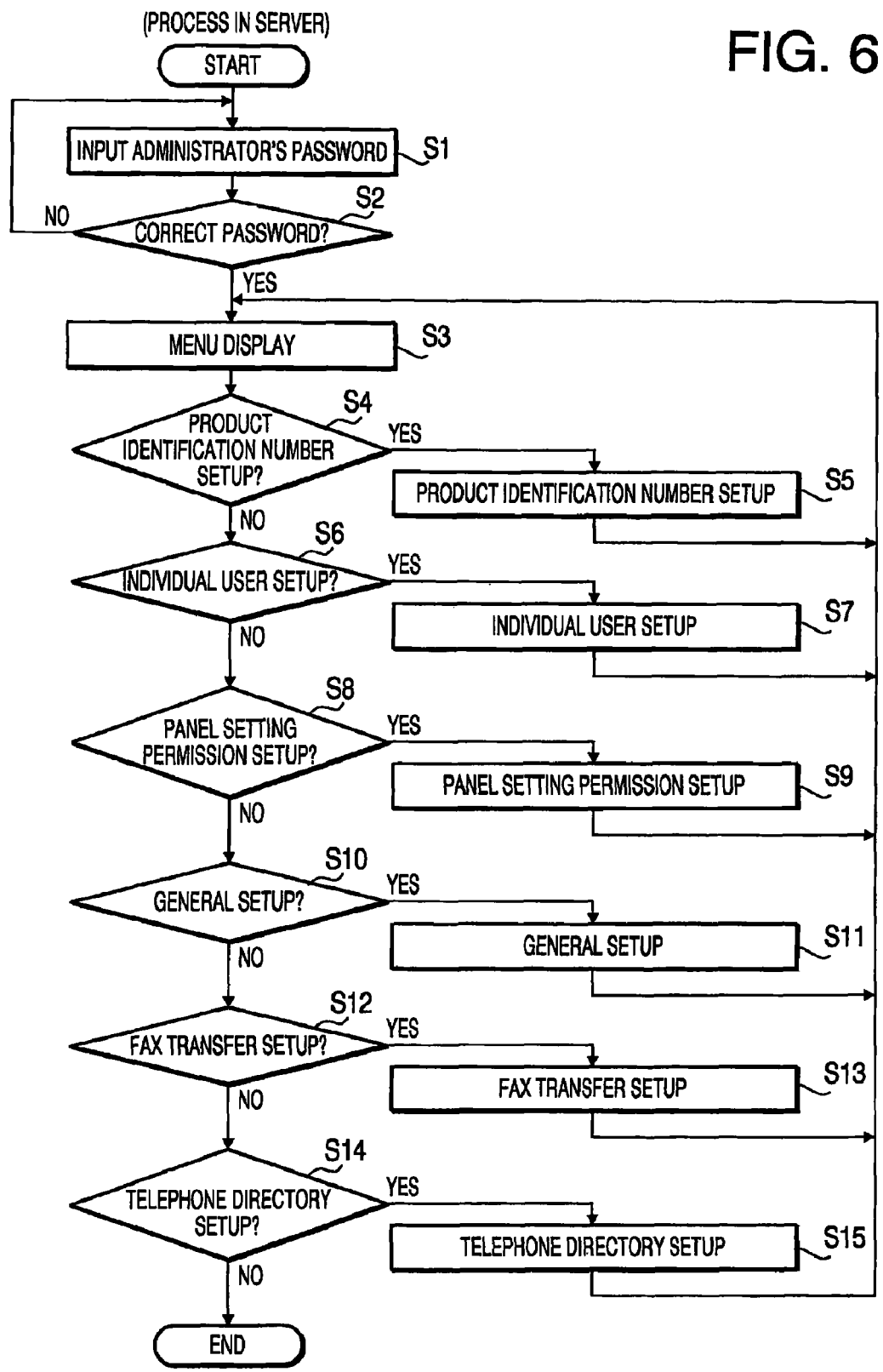
FIG. 6 is a flowchart which shows a setup process of the MFP setup file in the server.

Next, referring to FIG. 6, a process which sets up the MFP setup file 71 in server 2 is explained. FIG. 6 is the flowchart which shows the setup processing of the MFP setup file 71. This setup process is started when the program to set up the MFP setup file 71 in server 2 is booted.

Firstly, an administrator's password input screen is displayed, and the administrator's password is input (S1). If the input password is identical with a password stored in the administrator password memory 58b (S1: Yes), a menu screen is displayed in order to select an item which is to be set up next (S3). If the input password is not correct (S2: No), the CPU 52 returns to the process S1.

Next, it is determined which item was selected on the menu screen. Firstly, it is determined whether the selected item is to set up a product identification number (S4). If the selected item is a setup of product identification number (S4: Yes), a screen to set up the product identification number 71b and the file password 71c is displayed. The product identification number 71b and the file password 71c are input by the administrator (S5), and the CPU 52 returns to the menu screen, i.e., the process S3.

If it is determined that the product identification number is not selected in the process of S4 (S4: No), it is determined whether the selected item is a setup of the individual user setup information (S6). If the selected item is a setup of the individual user setup information (S6: Yes), a screen to set up the public information and the individual information is displayed. The public registration information and the individual registration information are input by the administrator (S7), the CPU 52 returns to the menu screen, i.e., the process of S3.

If it is determined that the selected item is not a setup of the individual user setup information (S6: No), it is determined whether the selected item is a setup of the panel setting permission setup information 71*d*. If the selected item is a setup of the panel setting permission setup information 71*d* (S8: Yes), a screen to set up the panel setting permission setup information 71*d* is displayed. Concerning each of the general setup, the FAX transfer setup and the telephone directory setup, it is input whether each setup is made to be possible with the operation panel 34 of the MFP 1 (S9), and the CPU returns to the menu screen, i.e., the process S3.

If it is determined that the panel setting permission setup information 71*d* is not selected (S8: No), it is determined whether the selected item is the general setup information 71*f*(S10). If the selected item is the general setup information 71*f*(S10: Yes), a screen to execute the general setup. The setup of reception mode, the setup of day and time, the setup of identification information and the setup of display characters are input (S11), and the CPU 52 returns to the menu screen, i.e., the process of S3.

If it is determined that the general setup information 71*f* is not selected (S10: No), it is determined whether the selected item is the setup of the FAX transfer setup information 71*g* (S12). If the selected item is the setup of the FAX transfer setup information 71*g* (S12: Yes), a screen to set up the FAX transfer setup. Setups of each item of "transfer off", "forward", "paging", "FAX storage" and "PC FAX reception" are input (S13), and the CPU 52 returns to the menu screen, i.e., the process S3.

If it is determined that the FAX transfer setup is not selected (S12: No), it is determined whether the selected item is the setup of the telephone directory setup information 71*h* (S14). If the selected item is a setup of the telephone directory setup information 71*h* (S14: Yes), a screen to set up the telephone directory setting. The setup of the one-touch dial, the setup of the speed dial, and the setup whether usage of the one-touch dial and the speed dial is allowed are input (S15), and the CPU 52 returns to the menu screen, i.e., the process S3.

Figure 7:
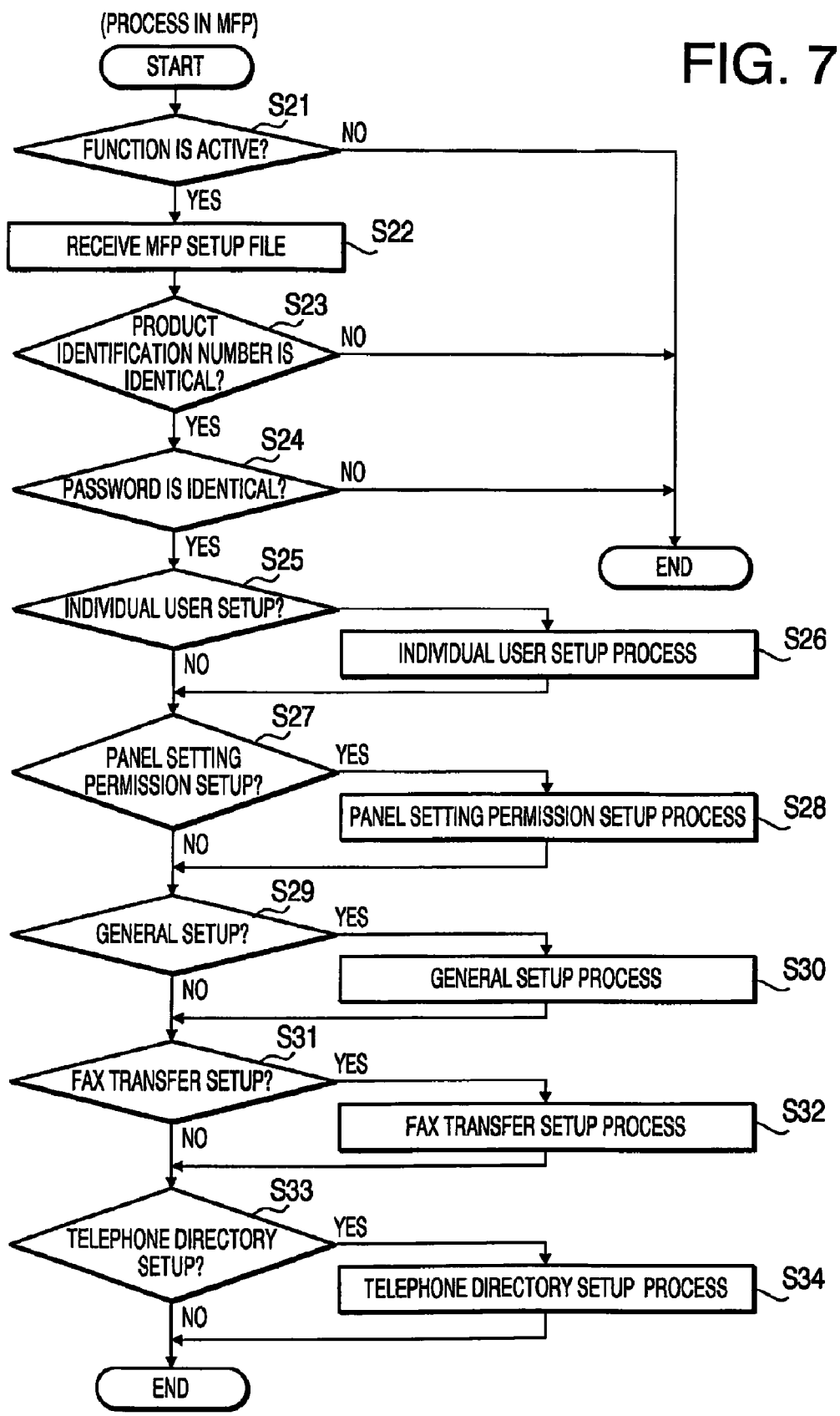
FIG. 7 is a flowchart which shows a setting process in the multi function peripheral.

If it is determined that the setup of the telephone directory setup information 71*h* is not selected (S14: No), it is determined that the setup process of the MFP setup file 71 is completed, and the setup process is terminated. As described above, the MFP setup file 71 is set up in the server 2. Next, referring to FIG. 7, a setup process which is executed by the CPU 12 of the MFP 1 is explained. FIG. 7 is a flowchart which shows a setting process. The MFP 1 requires the server 2 for the directory service every fixed period (for example, every 10 minutes) appointing a file name, for example, LDAP (Lightweight Directory Access Protocol). The server 2 informs about the address where the file having the file name is stored responding to the request, and the MFP 1 can acquire the file according to the address.

Firstly, it is determined whether a function which receives the MFP setup file 71 from the server 2 is set up to be executed (S21). If the function which receives the MFP setup file 71 from the server 2 is set up to be executed (S21: Yes), the MFP setup file 71 is received from the server 2 (S22), and it is determined whether the product identification number 71*b* written in the MFP setup file 71 matches the product identification number stored in ROM 14 (S23). If the product identification number 71*b* written in the MFP setup file 71 matches the product identification number stored in ROM 14 (S23: Yes), it is determined whether the file password 71*c* written in the MFP setup file 71 matches the file password stored in the password memory 18*c* of the flash memory 18 (S24). If the file password 71*c* written in the MFP setup file 71 matches the file password stored in the password memory 18*c* of the flash memory 18 (S24: Yes), it is determined whether the individual user setup information is written in the MFP setup file 71 (S25).

Furthermore, If the function which receives the MFP setup file 71 from the server 2 is not set up to be executed (S21: No), or if the product identification number 71*b* written in the MFP setup file 71 does not match the product identification number stored in ROM 14 (S23: No), or if the file password 71*c* written in the MFP setup file 71 does not match the file password stored in the password memory 18*c* of the flash memory 18 (S24: No), the setup process is terminated.

If it is determined that the individual user setup information is written in the MFP setup file 71 (S25: Yes), according to the public registration information and the individual registration information which are the individual user setup information written in the MFP setup file 71, the public information memory 18*a* and the individual information memory 18*b* of the flash memory are rewritten (S26).

If it is determined that the individual user setup information is not written in the MFP setup file 71 (S25: No), or if the process S26 is terminated, it is determined whether the panel setting permission setup information 71*d* is written in the MFP setup file 71 (S27).

If the panel setting permission setup information 71*d* is written in the MFP setup file 71 (S27: Yes), according to the panel setting permission setup information 71*d* written in the MFP setup file 71, as for the general setup, the FAX transfer setup and the telephone directory setup, the panel setting permission setup memory 18*d* of the flash memory 18 is rewritten whether each of them can be set up with the operation panel unit (S28).

If the panel setting permission setup information 71*d* is not written in the MFP setup file 71 (S27: No), or the process S28 is terminated, it is determined whether the general setup information is written in the MFP setup file (S29). If the general setup information is written in the MFP setup file (S29: Yes), according to the setup of the reception mode, the setup of day and time, the setup of the identification information and the setup of display characters written in the MFP setup file 71, the general setup memory 18*e* of the flash memory 18 is rewritten (S30).

If it is determined that the general setup information is not written in the MFP setup file (S29: No), or the process S28 is terminated, it is determined whether the FAX transfer setup information 71*g* is written in the MFP setup file 71 (S31). If the FAX transfer setup information 71*g* is written in the MFP setup file 71 (S31: Yes), according to the FAX transfer setup information 71*g* such as the facsimile forward setup, setup file 71, the remote code setup, the backup print setup stored in the MFP setup file 71, the FAX transfer setup memory 18*f* of the flash memory 18 is rewritten (S32).

If it is determined that the FAX transfer setup information 71*g* is not written in the MFP setup file 71 (S31: No), or if the process S32 is terminated, it is determined whether the telephone directory setup information 71*h* is written in the MFP setup file 71 (S33). If the telephone directory setup information 71*h* is written in the MFP setup file 71 (S33: Yes), according to the telephone directory setup information 71*h* which is the setting whether usage of the one-touch dial setup and the speed dial setup written in the MFP setup file 71, the telephone directory setup memory 18*g* of the flash memory 18 is rewritten (S32). If it is determined that the telephone directory setup information 71*h* is not written in the MFP setup file 71 (S33: No), the setup process is terminated. As described above, information of the MFP setup file 71 which is set up by the server 2 is updated and stored in the flash memory 18 of the MFP 1.

Figure 8:
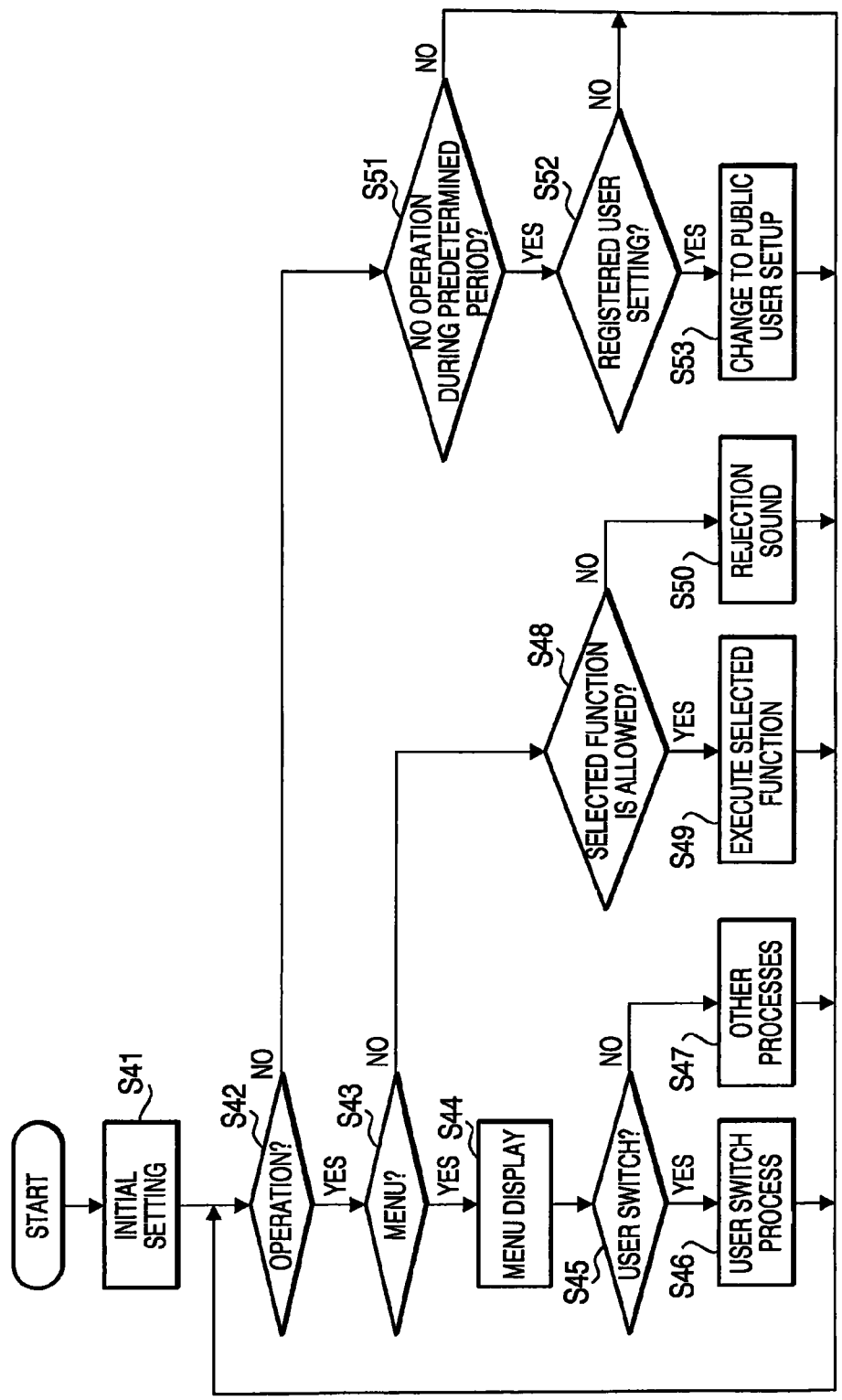
FIG. 8 is a flowchart which shows execution process of the functions of the multi function peripheral.

Next, referring to FIG. 8, an execution process of the functions which are executed by the CPU 12 of the MFP 1. FIG. 8 is a flowchart which shows a process that is booted up when a power source of the MFP 1 is turned on. Firstly, initial setting is executed (S41). In the initial setup, processes, such as reading a function setup of the public user stored in the function setting table memory 18*a* into the function restrictions table 16*a*1, are executed. Then, the MFP 1 returns to the standby state waiting for a user's operation.

It is determined whether an operation is done in the standby state (S42). If the operation is done (S42: Yes), it is determined whether the operation is to indicate an option displayed on the menu screen (S43). If the operation indicates the option displayed on the menu screen (S43: Yes), the menu screen is displayed (S44). In this menu screen, it is possible to select an operation to change a user or one of the other operations.

Then, it is determined whether a process to change a user is selected (S45). If the process to change the user is selected (S45: Yes), the process to change the user is executed (S46). In the user change processing, firstly, user names of the registered users, and then the user selects one of the user names. If a user name is selected, the input screen to input a password corresponding to the user name is displayed. If the password is input correctly, corresponding to the user name, based on the individual registration information stored in the individual information memory 18*b*, whether each of the functions is allowed to be used is set up in the function restrictions table 16*a* of the RAM 16. The public user can be selected as one of the users. If the public user is selected, without requesting the user to input a password, the function restrictions table 16*a* stored in the RAM 16 is set up to indicate whether usage of each function is allowed based on the public registration information stored in the public information memory 18*a*. If it is determined that the process to change the user is not selected, the selected process is executed (S47). If the process S46 or the process S47 is terminated, the CPU returns to the process of S42.

If it is determined that the selected operation does not indicate the option displayed on the menu screen, but to select one of the functions of the MFP 1 (S43: No), it is determined whether the selected function is allowed to be used (S48). If the selected operation is associated with an operation regarding the individual user setup, the determination is done referring to the function restrictions table 16*a* stored in the RAM16. If otherwise, the determination is controlled referring to the panel setting permission setup memory 18*d* and the telephone directory setup memory 18*g*, etc. of flash memory, 18.

If the selected function is allowed to be used (S48: Yes), the selected function is executed (S49). If the selected function is not allowed to be used (S48: No), the speaker unit 38 is made to sound to notify the user that usage of the function is not allowed (S50), and the LCD displays a message thereof. When the process S49 and the process S50 are completed, the CPU returns to the process S42.

On the other hand, if any one of the operators is determined not to be operated (S42: No), it is determined whether time while any one of the operators is not operated has elapsed over the prescribed time (S51). If the time while any one of the operators is not operated has elapsed over the prescribed time (S51: Yes), it is determined whether the function setup which is stored in the function restrictions table 16*a*1 is the registered user setup of the registered user (S52). If the function setup which is stored in the function restrictions table 16*a*1 is the registered user setup of the registered user register user setup (S52: Yes), the function restrictions table 16*a*1 is setup based on the public registration information stored in the function setting table memory 18*a* (S53). Due to the above processes, even if the register user does not execute the operation to set a user back to a public user after the registered user completes usage of the MFP 1, after elapsing the proscribed time, the user setup is returned to the public user setup. Therefore, it can be prevented for a general user who is not a registered user to use a function which is not allowed to be used. If it is determined that some of the operators is operated within the prescribed time (S51: No), or if the function setup which is stored in the function restrictions table 16*a*1 is not the registered user setup of the registered user (S52: No), or if the process S53 is completed, the CPU returns to the process S42.

As described above, it is written in the MFP setup file 71 whether usage of the setup operation of the plurality of functions of the MFP in the server 2. The MFP 1 refers to the MFP setup file 71, and whether the process which responds to the user's operation in the MFP 1 is to be executed is controlled.

Therefore, if you remember registration information which indicates whether usage of each of the plurality of the functions of the multi function peripheral is allowed is stored in the server 2, it is not necessary to do setups in the multi function peripheral, and the setups can be done easily. Further, if the registration information which indicates whether usage of each of the functions of the multi function peripherals is stored in the servers corresponding to the respective device identification information of the plurality of the multi function peripherals, it is not necessary to do setups in each of the multi function peripherals, and it is possible to do individual setup easily for each multi function peripheral.

Further, if the registration information which indicates whether usage of each of the functions of the multi function peripherals is stored in the servers corresponding to each user who has individual identification information and a public user who does not have individual identification information, it is not necessary to do setups in each of the multi function peripherals, and it is possible to do individual setup easily for each user. furthermore, if the registration information which indicates operation setups of each of the plurality of the functions of the multi function peripheral or the registration information which indicates whether usage of each of the functions of the operation unit that has a plurality of operators is stored in the server 2, it is not necessary to do setups in the multi function peripherals, and it is possible to do the setups easily.

In the above, the embodiments of the present invention have been described. An embodiment of the invention is not limited to the above embodiments. According to the claims of the invention, various embodiments may be realized.

For example, in the described embodiment, the MFP setup file 71 which is set up in the server 2 is read out by the MFP 1, and the information which is written in the MFP setup file 71 is stored in the flash memory 18 of the MFP. If some function is selected in the MFP 1, the flash memory 18 is referred to, and whether usage of the function is allowed is controlled. However, the MFP setup file 71 may not be read to the MFP 1. If some function is selected, the MFP setup file 71 stored in the server 2 may be referred to, and whether usage of the function is allowed may be controlled.

In the embodiment, when the register user or the administrator is authenticated, a password is input with the operation panel, and authentication of the user or the administrator is executed base on the password. However, the user's finger prints, veins of the palm of the hand, or face may be used in authentication.

Further, in the embodiment, a setup whether usage of the one-touch dial and the speed dial is allowed is done with the operation unit 34. The setup whether usage of the one-touch dial and the speed dial is allowed may be done for each user. For a public user, only usage of the one-touch dial may be allowed, and the public user may be disabled to communicate with partners using telephone or facsimile numbers set up as the one-touch dials.

What is claimed is:

1. A multi function peripheral which has a plurality of functions, comprising:
    a communication unit that communicates with an external storage device which has a connection with the multi function peripheral; and
    a registration information memory that stores registration information,
    identification memory storing information identifying the multi function peripheral;
    memory that stores computer readable instructions; and
    a processing unit configured to execute the computer readable instructions that, when executed, cause the multi function peripheral to provide:
        a registration information acquisition unit that acquires registration information stored in the external storage device through the communication unit and causes the acquired registration information to be stored in the registration information memory, the registration information including information indicating, for each of a plurality of users, whether each of the plurality of functions of the multi function peripheral is allowed to be used, and identification information of the multi function peripheral,
        a determination unit that determines whether the identification information of the multi function peripheral included in the acquired registration information matches the information identifying the multi function peripheral stored in the identification memory,
        a registration information updating unit that
            when the determination unit determines that the identification information included in the acquired registration information matches the information identifying the multi function peripheral stored in the identification memory, updates the registration information stored in the registration information memory with the acquired registration information, and
            when the determination unit determines that that the identification information included in the acquired registration information does not match the information identifying the multi function peripheral stored in the identification memory, prevents the registration information stored in the registration information memory from being updated with the acquired registration information,
        wherein the computer readable instructions when executed by the processing unit cause the multi function peripheral to control whether to prevent functions from executing based on the acquired registration information stored in the registration information memory so that functions of which usage is indicated to be allowed by the registration information are caused to be executed according to operations of the multi function peripheral by a user, and functions of which usage is indicated not to be allowed by the registration information are prevented from being executed irrespective of operations of the multi function peripheral by the user.

2. The multi function peripheral according to claim 1,
    wherein the registration information acquisition unit acquires registration information corresponding to the identification information of the multi function peripheral among multiple registration information corresponding to identification information of each of a plurality of multi function peripherals stored in the external storage device.

3. The multi function peripheral according to claim 1, further comprising:
    an input unit configured to receive input including individual identification information which is to identify the user,
    wherein the registration information acquisition unit acquires registration information stored in the external storage device corresponding to the individual identification information which is to identify the user based on the individual identification information input to the input unit.

4. The multi function peripheral according to claim 1, further comprising:
    an input unit configured to receive input including individual identification information which is to identify the user,
    wherein the registration information acquisition unit acquires registration information which identifies the user based on the individual identification information in a case that individual identification information is input into the input unit, and acquires registration information stored in the external storage device which does not correspond to any of the individual identification information.

5. The multi function peripheral according to claim 1,
    wherein the registration information acquisition unit acquires registration information indicating an operation setup of the plurality of functions from the storage device.

6. The multi function peripheral according to claim 1, further comprising:
    an operation unit configured to receive operator input to set up each of the plurality of functions,
    wherein the registration information acquisition unit acquires registration information indicating whether setup of each of the plurality of functions by the operation unit is allowed from the external storage device.

7. The multi function peripheral according to claim 1, wherein the computer readable instructions, which when executed, cause the multi function peripheral, in response to operations of the multi function peripheral by the user, to control whether to prevent functions from executing based on the acquired information stored in the registration information memory without accessing the external storage device.

8. The multi function peripheral according to claim 1, wherein the registration information acquisition unit periodically acquires the registration information.

9. A multi function peripheral system, comprising:
a multi function peripheral that has a plurality of functions; and
a storage device,
wherein the multi function peripheral has a communication unit, the storage device communicating with the multi function peripheral via the communication unit,
wherein the storage device includes:
a memory unit that stores registration information indicating whether each of the plurality of functions is allowed to be used and first computer readable instructions, and
a first processing unit configured to execute the first computer readable instructions that, when executed, cause the storage device to provide a registration information setup unit that stores the registration information in the memory unit, and
wherein the multi function peripheral includes:
a registration information memory that stores registration information, identification memory storing information identifying the multi function peripheral;
memory that stores second computer readable instructions;
a second processing unit configured to execute the second computer readable instructions that, when executed, cause the multi function peripheral to provide
a registration information acquisition unit that acquires registration information stored in the memory unit of the storage device via the communication unit and causes the acquired registration information to be stored in the registration information memory, the registration information including information indicating, for each of a plurality of users, whether each of the plurality of functions of the multi function peripheral is allowed to be used, and identification information of the multi function peripheral,
a determination unit that determines whether the identification information of the multi function peripheral included in the acquired registration information matches the information identifying the multi function peripheral stored in the identification memory,
a registration information updating unit that
when the determination unit determines that the identification information included in the acquired registration information matches the information identifying the multi function peripheral stored in the identification memory, updates the registration information stored in the registration information memory with the acquired registration information, and
when the determination unit determines that that the identification information included in the acquired registration information does not match the information identifying the multi function peripheral stored in the identification memory, prevents the registration information stored in the registration information memory from being updated with the acquired registration information,
wherein the second computer readable instructions when executed by the second processing unit cause the multi function peripheral to control whether to prevent functions from executing based on the acquired registration information stored in the registration information memory so that functions of which usage is indicated to be allowed by the registration information are caused to be executed according to operations of the multi function peripheral by a user, and functions of which usage is indicated not to be allowed by the registration information are prevented from being executed irrespective of operations of the multi function peripheral by the user.

10. The multi function peripheral system according to claim 9, which includes a plurality of multi function peripherals including the multi function peripheral.

11. The multi function peripheral system according to claim 9, wherein the second computer readable instructions, which when executed by the second processing unit, cause the multi function peripheral in response to operations of the multi function peripheral by the user to control whether to prevent functions from executing based on the acquired information stored in the registration information memory without accessing the memory unit.

12. The multi function peripheral system according to claim 9, wherein the registration information acquisition unit periodically acquires the registration information.

13. A functional control method for a multi function peripheral system which includes a multi function peripheral that has a plurality of functions, the multi function peripheral including a registration information memory that stores registration information and an identification memory storing information identifying the multi function peripheral, and a storage device external to the multi function peripheral, comprising the steps of:
setting up registration information indicating whether each of the plurality of functions is allowed to be used;
storing the registration information in the storage device;
acquiring registration information stored in a memory unit of the storage device via a communication unit;
storing the acquired registration information in the registration information memory, the registration information including information indicating, for each of a plurality of users, whether each of the plurality of functions of the multi function peripheral is allowed to be used, and identification information of the multi function peripheral;
determining whether the identification information of the multi function peripheral included in the acquired registration information matches the information identifying the multi function peripheral stored in the identification memory,
when the determining determines that the identification information included in the acquired registration information matches the information identifying the multi function peripheral stored in the identification memory, updating the registration information stored in the registration information memory with the acquired registration information,
when the determining determines that that the identification information included in the acquired registration information does not match the information identifying the multi function peripheral stored in the identification memory, preventing the registration information stored in the registration information memory from being updated with the acquired registration information, and
controlling whether to prevent functions from executing based on the acquired registration information stored in the registration information memory so as to:

cause functions of which usage is indicated to be allowed by the registration information to be executed according to operations of the multi function peripheral by a user, and prevent functions of which usage is indicated not to be allowed by the registration information from being executed irrespective of operations of the multi function peripheral by the user.

14. The functional control method according to claim 13, wherein in response to operations of the multi function peripheral by the user, the step of controlling whether to prevent functions from executing based on the acquired information stored in the registration information memory is performed without accessing the external storage device.

15. The functional control method claim 13, wherein the step of acquiring the registration information is performed periodically.

16. A non-transitory computer readable medium for a multi function peripheral which has a plurality of functions and includes a registration information memory that stores registration information and an identification memory storing information identifying the multi function peripheral, comprising computer readable instructions to be executed by a computer, the instructions causing the computer to function as:

a communication unit that communicates with an external storage device which has a connection with the multi function peripheral; and a registration information acquisition unit that acquires registration information stored in the external storage device through the communication unit and causes the acquired registration information to be stored in the registration information memory, the registration information including information indicating, for each of a plurality of users, whether each of the plurality of functions of the multi function peripheral is allowed to be used, and identification information of the multi function peripheral, a determination unit that determines whether the identification information of the multi function peripheral included in the acquired registration information matches the information identifying the multi function peripheral stored in the identification memory, a registration information updating unit that when the determination unit determines that the identification information included in the acquired registration information matches the information identifying the multi function peripheral stored in the identification memory, updates the registration information stored in the registration information memory with the acquired registration information, and when the determination unit determines that that the identification information included in the acquired registration information does not match the information identifying the multi function peripheral stored in the identification memory, prevents the registration information stored in the registration information memory from being updated with the acquired registration information, wherein the computer readable instructions when executed by a computer cause the multi function peripheral to control whether to prevent functions from executing based on the acquired registration information stored in the registration information memory so that functions of which usage is indicated to be allowed by the registration information are caused to be executed according to operations of the multi function peripheral by a user, and functions of which usage is indicated not to be allowed by the registration information are prevented from being executed irrespective of operations of the multi function peripheral by the user.

17. The non-transitory computer readable medium according to claim 16, wherein the computer readable instructions, when executed by a computer, cause the multi function peripheral, in response to operations of the multi function peripheral by the user, to control whether to prevent functions from executing based on the acquired information stored in the registration information memory without accessing the external storage device.

18. The non-transitory computer readable medium according to claim 16, wherein the registration information acquisition unit periodically acquires the registration information.

* * * * *